| United States Patent [19] | [11] Patent Number: 5,002,838 |
| --- | --- |
| Yasue et al. | [45] Date of Patent: Mar. 26, 1991 |

[54] ALUMINUM PLATING SUBSTANCE FOR ANODIZING

[75] Inventors: Yoshihiko Yasue; Hiroshi Kagechika, both of Tokyo, Japan

[73] Assignee: NKK Corporation, Tokyo, Japan

[21] Appl. No.: 393,806

[22] Filed: Aug. 14, 1989

[30] Foreign Application Priority Data

Aug. 23, 1988 [JP] Japan .................................. 63-210159

[51] Int. Cl.$^5$ .............................................. B32B 15/20
[52] U.S. Cl. ...................................................... 428/650
[58] Field of Search ......................................... 428/650

[56] References Cited

U.S. PATENT DOCUMENTS

| | | | |
| --- | --- | --- | --- |
| 2,443,870 | 6/1948 | Reynolds | 428/650 |
| 3,090,118 | 5/1963 | Hanzel | 428/650 |
| 3,489,534 | 1/1970 | Levinstein | 428/650 |
| 4,092,448 | 5/1978 | Coll-Palagos | 428/650 |

*Primary Examiner*—Peter D. Rosenberg
*Attorney, Agent, or Firm*—Frishauf, Holtz, Goodman & Woodward

[57] ABSTRACT

An aluminum plating material to be anodized comprising a substrate, a metal layer formed on the substrate, the metal layer being electrochemically nobler than aluminum and an aluminum alloy, and an aluminum layer formed on the metal layer. The aluminum plating material prevents peeling of an aluminum layer from the substrate upon anodizing, which allows formation of uniform pores of the anodizing film, and which provides good coloring and anitiwear properties of the anodized film.

36 Claims, 4 Drawing Sheets

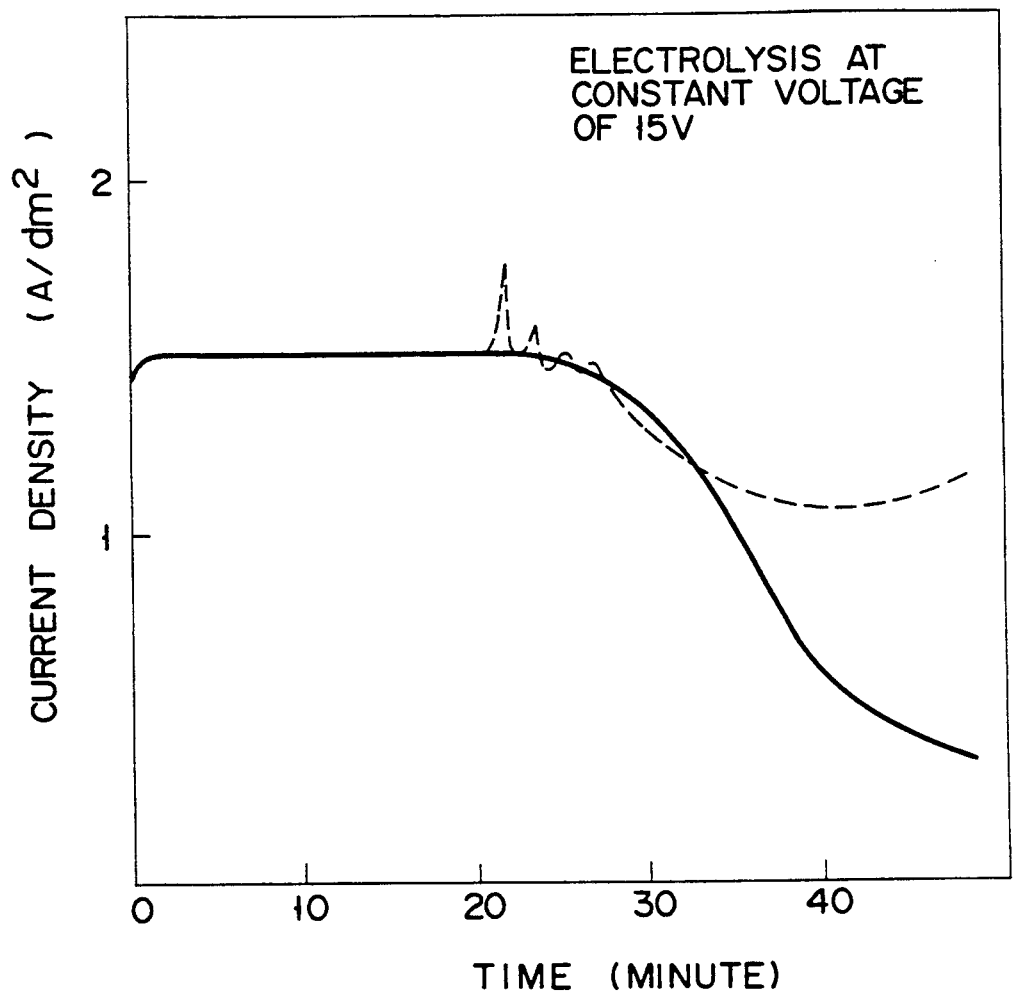
F I G. 4

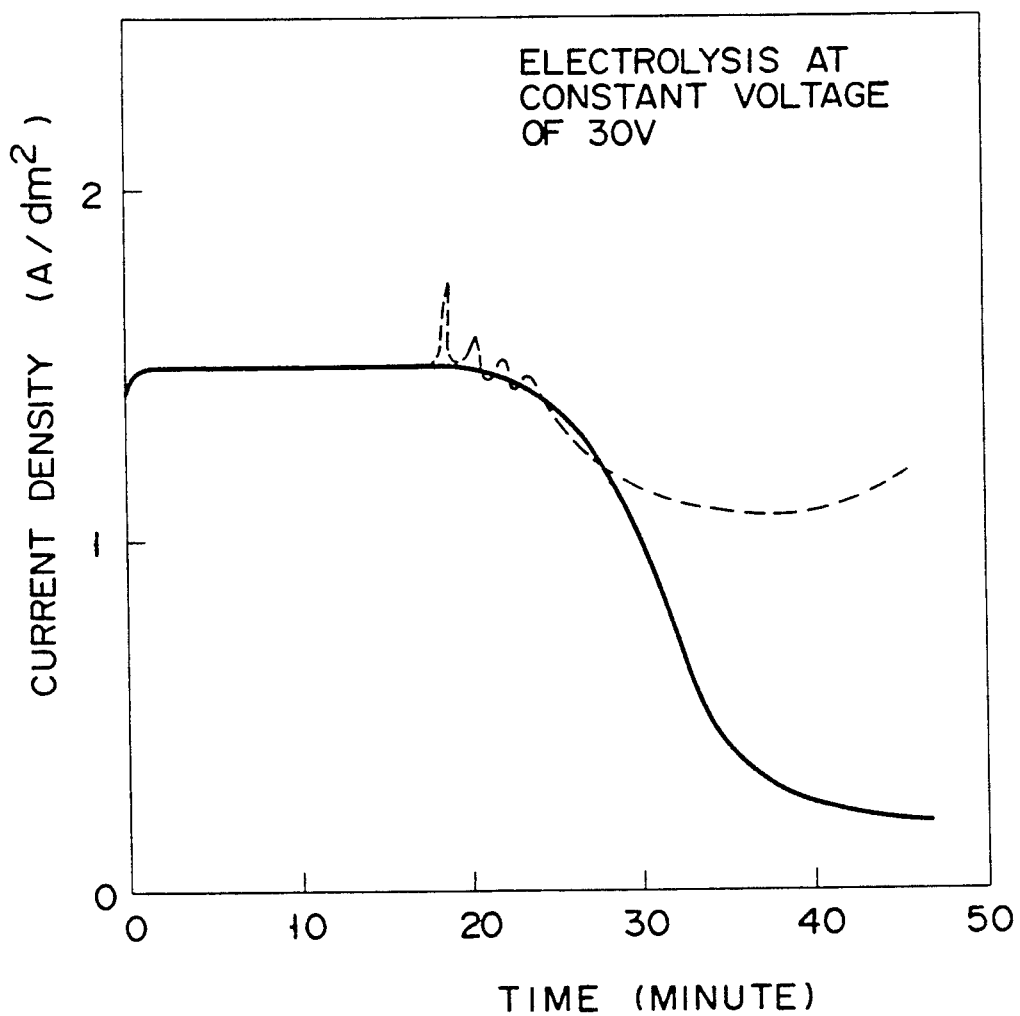
F I G. 5

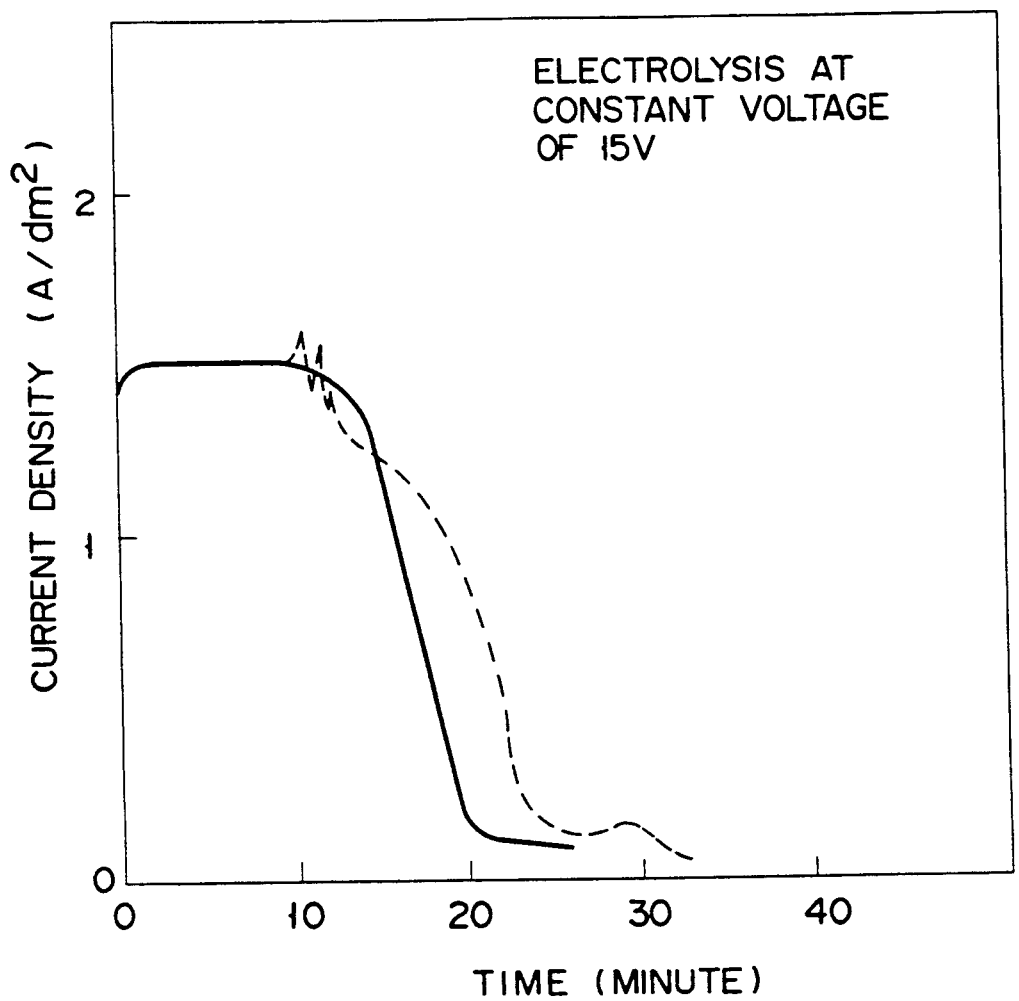
F I G. 6

ALUMINUM PLATING SUBSTANCE FOR ANODIZING

BACKGROUND OF THE INVENTION

1. Field of the Invention

The present invention relates to an aluminum plating material for anodizing, and an anodized material used for particularly, a colored medium and an antiwear material.

2. Description of the Related Art

Anodizing of aluminum or an aluminum alloy in an electrolytic solution such nitric acid, sulfuric acid, or chromic acid is known to those skilled in the art. An application of an anodized film for, e.g., aircraft, automobile, and optical components is also known. Various types of tools utilizing antiwear properties of hard anodized films are further known.

The present inventors have made extensive studies for a variety of applications of anodized materials which are produced by steps of plating a substrate of a metal except for aluminum or an aluminum alloy, a ceramic substrate, or a plastic substrate with aluminum or an aluminum alloy, and anodizing the plated aluminum film. The present inventors assume that an anodizing reaction of an Al film progresses in accordance with the following mechanism.

| Al dissolution: |
| --- |
| $Al \rightarrow Al^{3+}$, |
| $Al^{3+} + H_2O \rightarrow Al(OH)_3 \rightarrow Al_2O_3.H_2O$ |
| Anionic discharge and $Al_2O_3$ Production: |
| $2OH^- \rightarrow H_2O + O$ (nascent oxygen atom) |
| $Al + O \rightarrow Al_2O_3$ (insulating film) |

According to the studies of the present inventors, when a composite substrate obtained by directly aluminum-plating a metal substrate except for an aluminum or aluminum alloy substrate is anodized, dissolution of aluminum layer progresses. At the same time, the metal substrate is locally dissolved to result in an anodized aluminum film having nonuniform pores. In particular, when a metal substrate has low resistance to chemicals, it is found that an interface between the substrate and the aluminum layer is undesirably dissolved, and the resultant anodized film may peel from the substrate.

When a composite substrate obtained by directly aluminum-plating a nonconductive plastic or ceramic substrate is anodized, it is found that the anodized film tends to peel from the substrate if adhesion strength between the nonconductive substrate and the aluminum plating layer is low. In addition, since the material becomes insulative as a whole upon anodizing, coloring by electrolysis or electrolysis in pores cannot be performed.

SUMMARY OF THE INVENTION

It is a first object of the present invention to provide an aluminum plating material for allowing high anodizing performance.

It is a second object of the present invention to provide an aluminum plating material which can prevent peeling of an aluminum layer from a substrate upon anodizing, which allows formation of uniform pores of the anodized film, and which provides good coloring and antiwear properties of the anodized film.

In order to achieve the above objects, according to an aspect of the present invention, there is provided an aluminum plating material for anodizing comprising: a substrate; an aluminum layer serving as an outermost layer consisting of aluminum or an aluminum alloy; and a metal layer sandwiched between the substrate and the aluminum layer, the metal layer being electrochemically nobler than the aluminum layer and chemically stable.

In order to achieve the above objects, according to another aspect of the present invention, there is provided a method of anodizing an aluminum plating material, comprising the steps of: preparing a substrate; forming at least one metal layer which is electrochemically nobler than aluminum or an aluminum alloy and chemically stable and has a thickness of 0.01 μm to 2 μm; forming an aluminum layer of aluminum or an aluminum alloy on the metal layer, the aluminum layer having a thickness of 0.1 μm to 30 μm and constituting an outermost layer, thereby obtaining an aluminum plating material for anodizing; and anodizing the aluminum plating material.

The substrate to be plated comprises a metal except for aluminum or an aluminum alloy, a cold-rolled steel plate, and a stainless steel plate as well as a ceramic plate such as a nonconductive plastic or glass plate.

The metal layer may be exemplified as:

(1) a metal layer containing a component selected from the group consisting of Ti, Ni, Nb, Ta and W, and preferably Ti or Ni, (2) a metal layer of an alloy consisting of at least two components selected from the group consisting of Ti, Ni, Nb, Ta, and W, e.g., an Ni-Ti alloy, or (3) a metal layer of an alloy consisting of at least one component selected from the group consisting of Ti, Ni, Nb, Ta, and W and at least one component selected from the group consisting of Zn, Fe, P, Mn, and Cu, e.g., an Ni-Zn alloy.

The thickness of the metal layer must be 0.01 μm or more to protect the substrate from electrochemical or chemical treatments. The economical maximum thickness of the metal layer is 2 μm since it is electro-chemically nobler than aluminum and chemically stable. The practical thickness of the metal layer falls within the range of 0.1 to 0.5 μm. The presence of the metal layer prevents local damage to the substrate caused by dissolution of the aluminum layer. The metal layer also prevents the Al layer from peeling and facilitates production of an anodized film having uniform pores. Anodizing of even a nonconductive substrate can also be performed, or electrolytic precipitation of a metal or an alloy in the pores can be performed. Since the aluminum layer performs electrolytic precipitation for coloring of the anodized layer, the thickness of the aluminum layer must be generally 0.1 μm or more. However, the economical maximum thickness of the aluminum layer is 30 μm. An example of the aluminum alloy is an Al-Mg alloy.

BRIEF DESCRIPTION OF THE DRAWINGS

FIGS. 4 to 6 are graphs showing changes in currents as a function of time when aluminum plating materials of examples of the present invention are anodized at a constant voltage.

DETAILED DESCRIPTION OF THE PREFERRED EMBODIMENTS

A preferred embodiment of the present invention will be described below.

Figure 1:
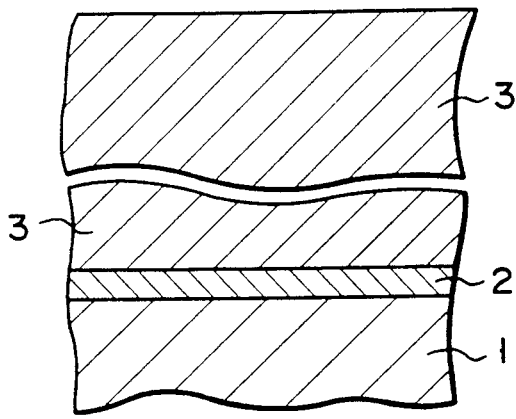
FIG. 1 is a schematic sectional view of an aluminum plating material to be anodized according to the present invention.
Figure 2:
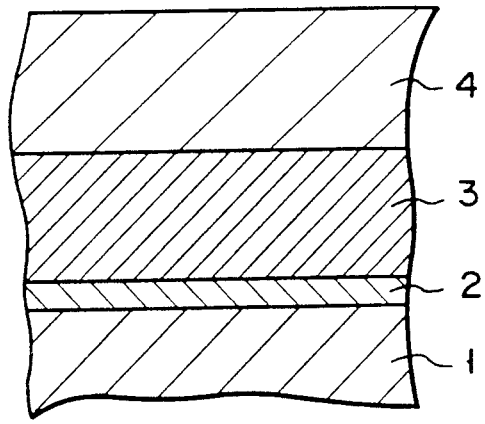
FIGS. 2 and 3 are schematic sectional views showing aluminum plating materials of the present invention after anodizing, respectively.
Figure 3:
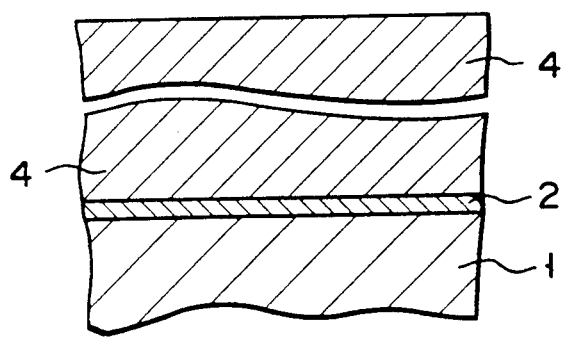

Referring to FIGS. 1 and 2, reference numeral 1 denotes a substrate; 2, a metal layer; and 3, an aluminum layer. Referring to FIGS. 2 and 3, reference numeral 4 denotes an anodized film. In each embodiment, a structure (FIG. 2) in which an aluminum layer is partly anodized to form an anodized film on the aluminum layer or a structure (FIG. 3) in which an aluminum layer is completely anodized is obtained.

EXAMPLE 1

Anodizing Aluminum Plating Substrate for Coloring

A 0.3-$\mu$m thick Ni film was formed on a 0.8-mm thick cold-rolled steel plate 1 by arc discharge type ion plating to form a metal layer 2. 10-$\mu$m thick Al was deposited on the metal layer 2 by vacuum deposition to form an aluminum layer 3. The plated substrate prepared as described above was anodized in a sulfuric acid bath under conditions indicated below to form a porous anodized film 4.

| Electrolytic Bath Composition: | 15 wt % aqueous solution of sulfuric acid |
| --- | --- |
| Electrolytic Bath Temperature: | 20° C. |
| Current Density: | 1 to 3 A/dm$^2$ |
| Electrolysis Time: | 10 to 30 minutes |
| Anodized Film Thickness: | 5 to 10 $\mu$m |

Changes in current in anodizing at a constant voltage of 15V are shown in FIG. 4. A solid line represents changes in current of Example 1. A broken line represents changes in current in anodizing following the same procedures as in Example 1 in a comparative example using a plating material having an Al layer formed on a substrate following the same procedures as in Example 1 except that a metal layer was not formed. In Example 1, a current density was decreased to $\frac{1}{2}$ after about 30 minutes. This indicates that anodizing of the aluminum layer 3 has progressed and the Ni metal layer 2 was exposed. That is to say, it indicates that a uniform anodized film which reached the Ni layer after Al anodizing is obtained. The end time was determined to be a timing at which the current was reduced to $\frac{1}{2}$. In the comparative example indicated by the broken line, close to the end of the electrolysis time, the current density largely varies. This indicates that the substrate is locally dissolved. The current is not greatly reduced because the cold-rolled steel plate is used as the substrate.

Coloring of the anodized film was performed by using the following electrolytic coloring bath:

| Electrolytic Bath Composition: | 20 g/l, CoSO$_4$ |
| --- | --- |
| | 25 g/l, H$_3$BO$_3$ |
| | 15 g/l, (NH$_4$)$_2$SO$_4$ |
| Electrolytic Condition: | 15 V (AC), 3 minutes |

By using the substrate of Example 1, a beautiful black colored film was obtained after electrolysis. That is, no black defects or cracks were found, and pores having a uniform pore size (diameters: about 100 to about 200 Å), a uniform depth, and a uniform distribution were produced.

EXAMPLE 2

Anodizing Aluminum Plating Substrate for Coloring

A 0.5-$\mu$m thick Ti film was formed on a 75 $\mu$m thick polyethylene terephthalate substrate 1 to obtain a metal layer 2. 15-$\mu$m thick Al was deposited on the metal layer 2 by vacuum deposition to form an aluminum layer 3. Following the same procedures as in Example 1, the resultant plated substrate was anodized in a sulfuric bath to form a porous film 4.

Changes in current during electrolysis in anodizing at a constant voltage of 15V were similar to these represented by the solid line (FIG. 2) of Example 1. In Example 2, the current density was reduced to $\frac{1}{2}$ or less after about 30 minutes. This indicates that the aluminum layer 3 was anodized and the Ti metal layer was exposed. Therefore, the uniform anodized film 4 which reached the Ti layer at the end of anodizing of Al is obtained. The anodizing end was defined as a timing at which the current was reduced to $\frac{1}{2}$.

Fe was precipitated in the pores of the anodized film by using the following electrolytic coloring bath:

| Electrolytic Bath Composition: | 250 g/l, FeSO$_4$ |
| --- | --- |
| | 30 g/l, H$_3$BO$_3$ |
| Electrolytic Bath Temperature: | 28 to 30° C. |
| Electrolytic Condition: | 8 V to 12 V (AC) |
| Electrolysis Time: | 3 minutes |
| Anodized Film Thickness: | 5 to 15 $\mu$m |

By using the plating material of Example 2, Fe was electrolytically precipitated in an amount of 0.5 mg/cm$^2$ or more, and a beautiful black colored film was obtained after electrolysis. That is, no black defects or cracks were found, and pores having a uniform pore size (diameters: about 100 to about 200 Å), a uniform depth, and a uniform distribution were produced.

EXAMPLE 3

Antiwear Anodizing Aluminum Plating Substrate

A 0.1-$\mu$m thick Ni-Zn alloy (Ni: 18 wt %; Zn: 82 wt %) film was formed on a 0.8-mm thick cold-rolled steel plate 1 by electroplating to obtain a metal layer 2. 10-$\mu$m thick Al was deposited on the metal layer 2 by vacuum deposition to form an aluminum layer 3. The resultant substrate was anodized in an oxalic acid bath under the conditions indicated below to form a porous film 4.

| Electrolytic Bath Composition: | 27 g/l, (COOH)$_2$ |
| --- | --- |
| Electrolytic Bath Temperature: | 20° C. |
| Current Density: | 1 to 3 A/dm$^2$ |
| Electrolysis Time: | 10 to 30 minutes |
| Anodized Film Thickness: | 5 to 10 $\mu$m |

Changes in current in anodizing at a constant voltage of 30V are shown in FIG. 5. A solid line represents changes in current of Example 3. A broken line represents changes in current in anodizing following the same procedures as in Example 3 in a comparative example using a plating material having an Al layer formed on a substrate following the same procedures as in Example 3 except that a metal layer was not formed. In Example 3, a current density was decreased to ½ after about 25 minutes. This indicates that anodizing of the aluminum layer 3 has progressed and the Ni-Zn alloy was exposed. That is to say, it indicates that a uniform anodized film which reached the Ni-Zn alloy layer after Al anodizing is obtained. In the comparative example indicated by the broken line, close to the end of the electrolysis time, the current density largely varies. This indicates that the substrate is locally dissolved. The current is not greatly reduced because the cold-rolled steel plate is used as the substrate.

The resultant porous film 4 had a Vicker's hardness (HV) value of 550 and was found to be an anodized film having excellent antiwear properties.

EXAMPLE 4

Anodizing Aluminum Plating Substrate for Coloring

A 0.15-$\mu$m thick Ni-Ti film was formed on a 0.8-mm thick silicon substrate 1 by vacuum deposition to form a metal layer 2. 5-$\mu$m thick Al-Mg (Mg: 5 wt %) was deposited on the metal layer 2 by vacuum deposition to form an aluminum layer 3. The plated substrate prepared as described above was anodized in a sulfuric acid bath under the conditions indicated below to form a porous anodized film 4.

| | |
|---|---|
| Electrolytic Bath Composition: | 15 wt % aqueous solution of sulfuric acid |
| Electrolytic Bath Temperature: | 20° C. |
| Current Density: | 1 to 3 A/dm$^2$ |
| Electrolysis Time: | 10 to 30 minutes |
| Anodized Film Thickness: | 1 to 5 $\mu$m |

Changes in current in anodizing at a constant voltage of 15V are shown in FIG. 6. A solid line represents changes in current of Example 4. A broken line represents changes in current in anodizing following the same procedures as in Example 4 in a comparative example using a plating material having an Al-Mg alloy layer formed on a substrate following the same procedures as in Example 1 except that a metal layer was omitted. In Example 4, a current density was decreased to 1/5 after about 15 minutes. This indicates that anodizing of the Al-Mg alloy layer 3 has progressed and the Ni-Ti alloy layer 2 was exposed. In the comparative example, close to the end of the electrolysis time, the current density largely varies. This indicates that adhesion strength between the substrate and the anodized film is insufficient.

Coloring of the anodized film was performed by using the following electrolytic coloring bath:

| | |
|---|---|
| Electrolytic Bath Composition: | 20 g/l, CoSO$_4$ |
| | 25 g/l, H$_3$BO$_3$ |
| | 15 g/l, (NH$_4$)$_2$SO$_4$ |
| Electrolytic Condition: | 15 V (AC), 3 minutes |

By using the substrate of Example 4, a beautiful black colored film was obtained after electrolysis. That is, no black defects or cracks were found, and pores having a uniform pore size (diameters: about 100 to about 200 Å), a uniform depth, and a uniform distribution were produced.

In the above examples, Ni, Ti, Ni-Zn, and Ni-Ti are exemplified as the materials for the metal layers. A material for the metal layer may be any material which is electrochemically nobler than the material of the aluminum layer and chemically stable. For example, Nb, Ta, or W, or its alloy with Fe, P, Mn or Cu may be used to obtain the same effect as in the above examples.

What is claimed is:

1. An anodizable aluminum plated material comprising:
   a substrate;
   an aluminum layer serving as an outermost layer, the aluminum layer consisting of aluminum or an aluminum alloy; and
   a metal layer sandwiched between the substrate and the aluminum layer, the metal layer being electrochemically nobler than the aluminum layer and chemically stable to an electrolyte used for aluminum anodization.

2. A material according to claim 1, wherein the metal layer is a layer selected from the group consisting of:
   (1) a metal layer containing a component selected from the group consisting of Ti, Ni, Nb, Ta and W,
   (2) a metal layer of an alloy consisting of at least two components selected from the group consisting of Ti, Ni, Nb, Ta, and W, and
   (3) a metal layer of an alloy consisting of at least one component selected from the group consisting of Ti, Ni, Nb, Ta, and W and at least one component selected from the group consisting of Zn, Fe, P, Mn, and Cu.

3. A material according to claim 1, wherein
   the metal layer is at least one layer consisting of one component selected from the group consisting of Ti, Ni, Nb, Ta, and W and having a thickness of 0.01 $\mu$m to 2 $\mu$m, and
   the aluminum layer has a thickness of 0.1 $\mu$m to 30 $\mu$m.

4. A material according to claim 1, wherein
   the metal layer is at least one layer consisting of two components selected from the group consisting of Ti, Ni, Nb, Ta, and W and having a thickness of 0.01 $\mu$m to 2 $\mu$m, and
   the aluminum layer has a thickness of 0.1 $\mu$m to 30 $\mu$m.

5. A material according to claim 1, wherein
   the metal layer is at least one layer having a thickness of 0.01 $\mu$m to 2 $\mu$m and consisting of one component selected from the group consisting of Ti, Ni, Nb, Ta, and W and one component selected from the group consisting of Zn, Fe, P, Mn, and Cu, and
   the aluminum layer has a thickness of 0.1 $\mu$m to 30 $\mu$m.

6. A material according to claim 1, wherein the substrate is made of one material selected from the group consisting of a metal except for aluminum and an aluminum alloy, a ceramic substance, and a plastic substance.

7. A material according to claim 6, wherein the substrate is made of one of a cold-rolled steel plate and a stainless steel plate.

8. A material according to claim 6, wherein the substrate is made of nonconductive material.

9. A method of preparing an anodized aluminum plated material, comprising the steps of:
   providing a substrate;

forming at least one metal layer on the substrate, the at least one metal layer being electrochemically nobler than aluminum or an aluminum alloy and being chemically stable to an electrolyte used for aluminum anodization;

forming an aluminum layer of aluminum or an aluminum alloy on the metal layer, the aluminum layer constituting an outermost layer, thereby obtaining an aluminum plating material; and anodizing the aluminum plated material to form an anodized film layer on the surface of the aluminum layer.

10. A method according to claim 9, wherein the metal layer has a thickness falling within a range of 0.01 μm to 2 μm, and the aluminum layer has a thickness falling within a range of 0.1 μm to 30 μm.

11. A method according to claim 9, wherein the metal layer is a layer selected from the group consisting of:
(1) a metal layer containing a component selected from the group consisting of Ti, Ni, Nb, Ta and W,
(2) a metal layer of an alloy having at least two components selected from the group consisting of Ti, Ni, Nb, Ta, and W, and
(3) a metal layer of an alloy consisting of at least one component selected from the group consisting of Ti, Ni, Nb, Ta, and W and at least one component selected from the group consisting of Zn, Fe, P, Mn, and Cu.

12. A method according to claim 9, wherein
the at least one metal layer comprises one component selected from the group consisting of Ti, Ni, Nb, Ta, and W and has a thickness of 0.01 μm to 2 μm; and
the aluminum layer has a thickness of 0.1 μm to 30 μm.

13. A method according to claim 9, wherein
the at least one metal layer comprises two components selected from the group consisting of Ti, Ni, Bn, Ta, and W and has a thickness of 0.01 μm to 2 μm; and
the aluminum layer has a thickness of 0.1 μm to 30 μm.

14. A method according to claim 9, wherein
the at least one metal layer has a thickness of 0.01 μm to 2 μm and comprises one component selected from the group consisting of Ti, Ni, Nb, Ta, and W and at least one component selected from the group consisting of Zn, Fe, P, Mn, and Cu; and
the aluminum layer has a thickness of 0.1 μm to 30 μm.

15. A method according to claim 9, wherein the substrate is made of one material selected from the group consisting of a metal except for aluminum and an aluminum alloy, a ceramic substance, and a plastic substance.

16. A method according to claim 9, further comprising the step of coloring the anodized film layer.

17. An anodized aluminum plated material comprising:
a substrate;
at least one metal layer formed on the substrate, the metal layer being electrochemically nobler than aluminum or an aluminum alloy and chemically stable to an electrolyte used for aluminum anodization;
an aluminum layer formed on the metal layer, the aluminum layer consisting of aluminum or an aluminum alloy; and
an anodized film layer formed on the surface of the aluminum layer.

18. A material according to claim 17, wherein the metal layer has a thickness falling within a range of 0.01 μm to 2 μm, and a total thickness of the aluminum layer and the anodized film layer falls within a range of 0.1 μm to 30 μm.

19. A material according to claim 17, wherein the metal layer is a layer selected from the group consisting of:
(1) a metal layer containing a component selected from the group consisting of Ti, Ni, Nb, Ta and W,
(2) a metal layer of an alloy consisting of at least two components selected from the group consisting of Ti, Ni, Nb, Ta, and W, and
(3) a metal layer of an alloy consisting of at least one component selected from the group consisting of Ti, Ni, Nb, Ta, and W and at least one component selected from the group consisting of Zn, Fe, P, Mn, and Cu.

20. A material according to claim 17, wherein
the metal layer is at least one layer consisting of one component selected from the group consisting of Ti, Ni, Nb, Ta, and W and having a thickness of 0.01 μm to 2 μm, and
a total thickness of the aluminum layer and the anodized film layer falls within a range of 0.1 μm to 30 μm.

21. A material according to claim 17, wherein
the metal layer is at least one layer consisting of two components selected from the group consisting of Ti, Ni, Nb, Ta, and W and having a thickness of 0.01 μm to 2 μm, and
a total thickness of the aluminum layer and the anodized film layer falls within a range of 0.1 μm to 30 μm.

22. A material according to claim 17, wherein
the metal layer is at least one layer having a thickness of 0.01 μm to 2 μm and consisting of one component selected from the group consisting of Ti, Ni, Nb, Ta, and W and at least one component selected from the group consisting of Zn, Fe, P, Mn, and Cu, and
a total thickness of the aluminum layer and anodized film layer falls within a range of 0.1 μm to 30 μm.

23. A material according to claim 17, wherein the substrate is made of one material selected from the group consisting of a metal except for aluminum and an aluminum alloy, a ceramic substance, and a plastic substance.

24. An anodized aluminum plated material comprising:
a substrate;
at least one metal layer formed on the substrate, the metal layer being electrochemically nobler than aluminum or an aluminum alloy and chemically stable to an electrolyte used for aluminum anodization; and
a completely anodized aluminum or aluminum alloy film layer formed on the metal layer.

25. A material according to claim 24, wherein the metal layer has a thickness falling within a range of 0.01 μm to 2 μm, and the anodized film layer has a thickness falling within a range of 0.1 μm to 30 μm.

26. A material according to claim 24, wherein the metal layer is a layer selected from the group consisting of:

(1) a metal layer containing a component selected from the group consisting of Ti, Ni, Nb, Ta and W,
(2) a metal layer of an alloy consisting of at least two components selected from the group consisting of Ti, Ni, Nb, Ta, and W, and
(3) a metal layer of an alloy consisting of at least one component selected from the group consisting of Ti, Ni, Nb, Ta, and W and at least one component selected from the group consisting of Zn, Fe, P, Mn, and Cu.

27. A material according to claim 24, wherein
the metal layer is at least one layer consisting of one component selected from the group consisting of Ti, Ni, Nb, Ta, and W and having a thickness of 0.01 μm to 2 μm, and
the anodized film layer has a thickness of 0.1 μm to 30 μm.

28. A material according to claim 24, wherein
the metal layer is at least one layer consisting of two components selected from the group consisting of Ti, Ni, Nb, Ta, and W and having a thickness of 0.01 μm to 2 μm, and
the anodized film layer has a thickness of 0.1 μm to 30 μm.

29. A material according to claim 24, wherein
the metal layer is at least one layer having a thickness of 0.01 μm to 2 μm and consisting of one component selected from the group consisting of Ti, Ni, Nb, Ta, and W and at least one component selected from the group consisting of Zn, Fe, P, Mn, and Cu, and
the anodized film layer has a thickness of 0.1 μm to 30 μm.

30. A material according to claim 24, wherein the substrate is made of one material selected from the group consisting of a metal except for aluminum and an aluminum alloy, a ceramic substance, and a plastic substance.

31. A method according to claim 9, wherein a surface layer of the aluminum layer is anodized.

32. A method according to claim 9, wherein the entire aluminum layer is anodized.

33. An anodized aluminum plated material comprising:
a cold-rolled steel plate substrate;
a 0.1–0.5 μm thick metal layer of nickel formed on the substrate;
a 5–30 μm thick aluminum layer formed on the metal layer; and
a 5–10 μm thick anodized film layer formed by anodizing the aluminum layer.

34. An anodized aluminum plated material comprising:
a polyethylene terephthalate substrate;
a 0.1–0.5 μm thick metal layer of tin formed on the substrate;
a 5–30 μm thick aluminum layer formed on the metal layer; and
a 5–15 μm thick anodized film layer formed by anodizing the aluminum layer.

35. An anodized aluminum plated material comprising:
a cold-rolled steel plate substrate;
a 0.1–0.5 μm thick metal layer of nickel-zinc formed on the substrate;
a 5–30 μm thick aluminum layer formed on the metal layer; and
a 5–10 μm thick anodized film layer formed by anodizing the aluminum layer.

36. An anodized aluminum plated material comprising:
a silicon substrate;
a 0.1–0.5 μm thick metal layer of nickel-tin formed on the substrate;
a 1–30 μm thick aluminum-magnesium layer formed on the metal layer; and
a 1–5 μm thick anodized film layer formed by anodizing the aluminum-magnesium layer.

* * * * *